Figure 4:
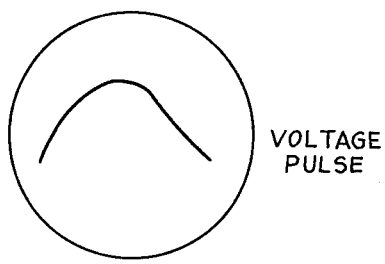

July 24, 1962
G. I. KLEIN ET AL
3,046,477
APPARATUS AND METHOD FOR PULSE HUM MEASUREMENTS
Filed Feb. 7, 1956
2 Sheets-Sheet 1
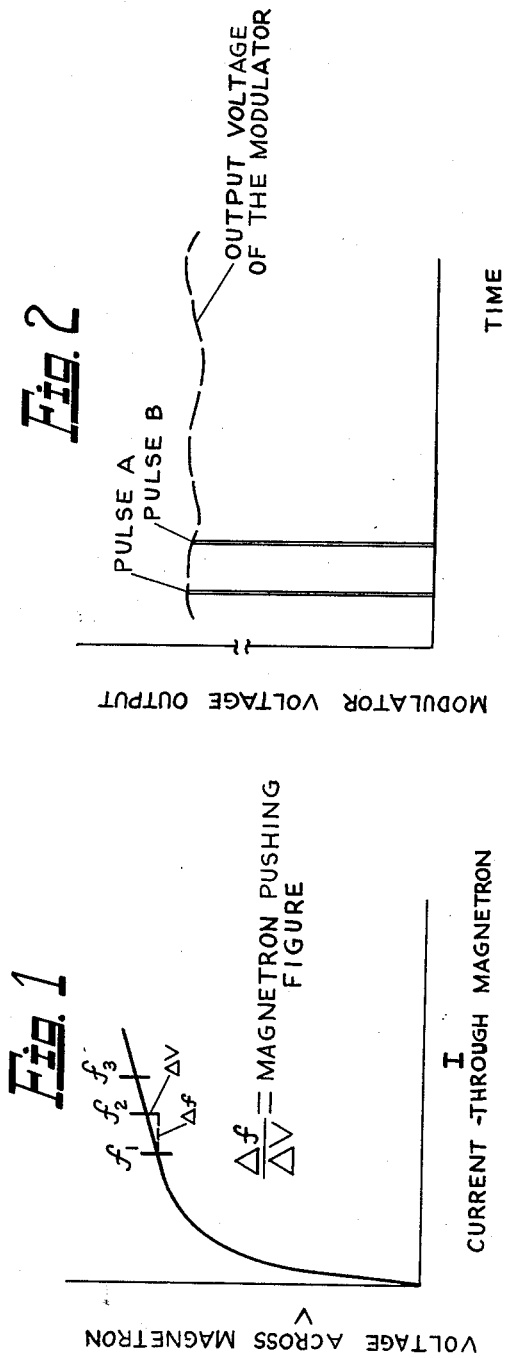
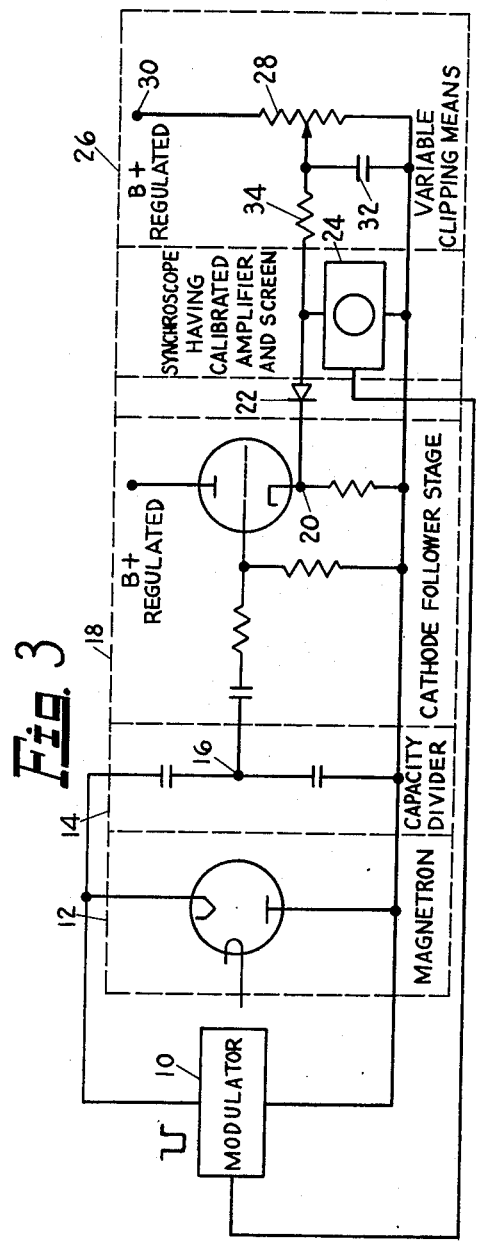
INVENTORS
GERALD I. KLEIN
MARVIN J. UNGAR
BY
*George Lipkin*
*Lee I. Huntzberger*
ATTORNEYS

BEFORE CLIPPING

VOLTAGE PULSE

AFTER CLIPPING

RIPPLE VOLTAGE

CURRENT PULSE

RIPPLE CURRENT

United States Patent Office 3,046,477
Patented July 24, 1962

3,046,477
APPARATUS AND METHOD FOR PULSE HUM MEASUREMENTS
Gerald I. Klein, Wannamassa, N.J., and Marvin J. Ungar, New York, N.Y., assignors to the United States of America as represented by the Secretary of the Navy
Filed Feb. 7, 1956, Ser. No. 564,085
4 Claims. (Cl. 324—57)
(Granted under Title 35, U.S. Code (1952), sec. 266)

The invention described herein may be manufactured and used by or for the Government of the United States of America for governmental purposes without the payment of any royalties thereon or therefor.

This invention concerns pulse amplitude hum measurements and more particularly concerns the measurement of minute variations in the amplitudes of a continuous chain of substantially identical pulses whose duration may be as short as 0.1 microsecond and whose amplitude variations may be as small as 0.3 percent of average pulse amplitude.

Pulse amplitude hum measurements have general utility where pulse circuitry is concerned but have especial significance where moving target indicator radars are concerned. Moving target indicator radar is subsequently abbreviated to MTI. To clearly set forth reasons for the especial significance of pulse hum measurements where MTI is concerned, some fundamental characteristics of MTI are included in this description.

During MTI operation, the antenna thereof radiates a continuous chain of substantially identical high frequency energy pulses. The chain of radiated pulses are characterized by a substantially fixed pulse repetition rate and a substantially fixed carrier frequency. The antenna intercepts a fraction of that part of the radiated energy which is reflected from targets in the path of the radiated energy. If there is no relative velocity between the MTI antenna and a target while the antenna is radiating energy toward the target, that fraction of the energy reflected from the target and intercepted by the antenna will be of the same pulse repetition rate and the same carrier frequency as the energy radiated from the antenna. If there is relative velocity between the antenna and a target while the antenna is radiating energy toward the target, that fraction of the radiated energy reflected from the target and intercepted by the antenna will be of a somewhat different pulse repetition rate and somewhat different carrier frequency from the energy radiated from the antenna. These differences in pulse repetition rate and carrier frequency are well known manifestations of the Doppler effect. Depending on its design, an MTI translates either one or both of the differences in the pulse repetition rate and the carrier frequency into an indication of the presence of a moving target and the velocity of the moving target.

In that type of MTI which detects and processes into moving target information differences between the carrier frequency of the radiated energy and the carrier frequency of the fraction of the radiated energy reflected from a target, optimum results are obtained when the carrier frequency of the radiated energy is absolutely constant. If the carrier frequency of the radiated energy is not absolutely constant, there are differences between the carrier frequency of the radiated energy and the carrier frequency of that fraction of the radiated energy reflected from the a reflecting barrier even when there is no relative velocity between the reflecting barrier and the MTI antenna. Taking the variations in radiated carrier frequency into account presents a problem on top of other operating problems; the magnitude of the problem depends on the variation in radiated carrier frequency.

When energy is reflected from a moving target the differences between the carrier freqency of the radiated energy and the carrier frequency of that fraction of the radiated energy reflected from the moving target is due of the combined effects of variation in the carrier frequency of the radiated energy and velocity of the moving target.

Because of practical component limitations, MTI carrier frequency is not absolutely constant. In practice, carrier frequency tolerances are established for each MTI. The tolerances for the radiated carrier frequency of various types of MTI equipment are based in part upon performance requirements. Variations in the radiated carrier frequency within the tolerances do not upset the operation of the MTI.

The variation in radiated carrier frequency of an MTI is in part due to the MTI transducer which generates the carrier frequency energy and is in part due to the power supply means for the transducer. The transducer discussed herein for explanatory purposes and not in a limiting sense is the magnetron. The power supply means for the magnetron is hereinafter referred to as a modulator. The frequency of the energy generated by a magnetron, and thus the carrier frequency of the energy radiated from an MTI including the magnetron, is effected by amplitude hum or ripple in voltage applied across the magnetron by its modulator and also by A.C. heater effects in the magnetron. Pulse amplitude hum measurements made in accordance with this invention point the way to significant improvements in magnetrons in modulators and in MTI design and operation.

An object of this invention is to provide a method and apparatus for making pulse amplitude hum measurements.

A further object is to provide a method and apparatus for making measurements of minute variations in the amplitudes of a continuous chain of substantially identical pulses whose duration may be as short as 0.1 microsecond and whose amplitude variations may be as small as 0.3 percent of the average pulse amplitude.

A further object is to isolate, examine, and measure amplitude modulation in a continuous chain of substantially identical pulses occurring at a substantially fixed repetition rate.

A further object is to isolate, examine, and measure current amplitude modulation in a continuous chain of substantially identical current pulses occurring at a substantially fixed repetition rate and flowing through an electron discharge device.

A further object is to compare amplitude modulation in a continuous chain of substantially identical current pulses flowing through an electron discharge device that has a heater filament, under a first condition wherein the filament is connected to an A.C. power supply and under a second condition wherein the filament is connected to a regulated D.C. power supply, respectively.

A further object is to ascertain the dynamic impedance of an electronic component around its operating point by means of pulse amplitude hum or ripple measurements.

Figure 5:
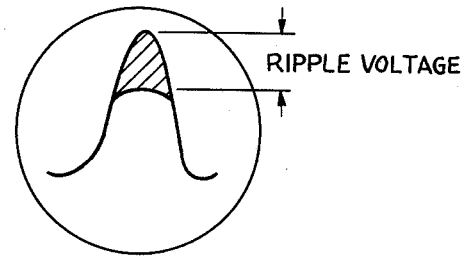
Figure 6:
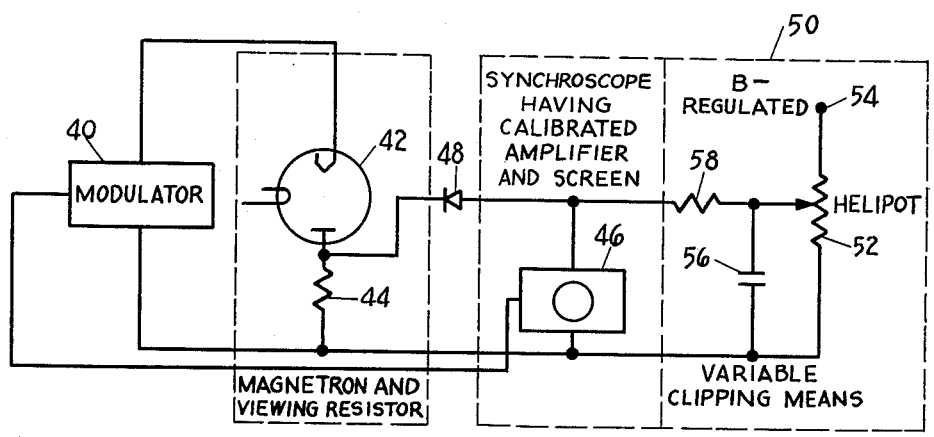
Figure 7:
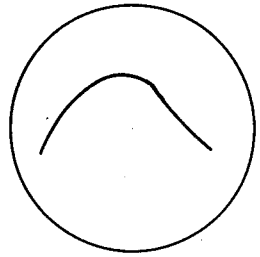
Figure 8:
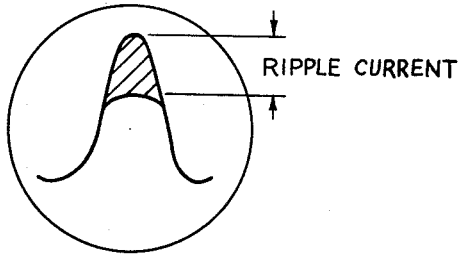

Other objects and many of the attendant advantages of this invention will be readily appreciated as the same becomes better understood by reference to the following detailed description when considered in connection with the accompanying drawings wherein:

FIG. 1 shows a graph showing in general the shape of the dynamic characteristics of a magnetron, FIG. 2 shows a graph of potential modulator output voltage at any instant in broken lines and output pulses occurring at a fixed repetition rate in solid lines for illustrating a source of pulse amplitude hum, FIG. 3 shows a circuit arrangement for measuring voltage amplitude hum in the output of a modulator, FIGS. 4 and 5 show the graphic displays seen on the synchroscope in the circuit of FIG. 3, FIG. 6 shows a circuit arrangement for measuring current amplitude hum in the current pulses through a magnetron, and FIGS. 7 and 8 show the graphic display seen on the synchroscope in the circuit of FIG. 6.

Though a magnetron is designed to generate energy of a particular frequency, actually the frequency of its generated energy varies somewhat with variation in the instantaneous net voltage between its anode and cathode. The term "pushing figure" is used to express variation in frequency of its generated energy due to variation in voltage applied across the magnetron. As indicated in FIG. 1, the pushing figure is defined as $$\frac{\Delta f}{\Delta V}$$

measured around the operating point of the magnetron. FIG. 1 which illustrates a dynamic characteristic for a magnetron also indicates change in frequency with change in applied voltage.

Amplitude hum among the pulses generated by a modulator and applied across a magnetron generally is at line frequency or a harmonic thereof (60 cycle or 120 cycle). As shown in FIG. 2, pulse B which follows pulse A by a number of intermediate pulses, not shown, is of somewhat smaller amplitude than pulse A due to the amplitude hum in the pulses generated by the modulator. In an MTI, for any given frequency tolerance for the MTI, and for any given pushing figure for the magnetron in the MTI, the amplitude hum or ripple in the modulator output must not exceed a particular level in order that frequency deviation does not exceed the tolerance. The variation in frequency generated by the magnetron is in part also caused by the use of an A.C. supply for the magnetron heater; where there is imbalance in the circuit consisting of A.C. supply and magnetron heater due to inaccurate centertap or the like, a net voltage appears in series with the voltage applied by modulator to the magnetron, causing or contributing to variation in generated frequency.

The circuit of FIG. 3 makes it possible to ascertain amplitude hum or ripple in the pulse to pulse output of a modulator when connected to a magnetron. The circuit includes the modulator 10 whose pulse amplitude hum or ripple is being ascertained. The modulator 10 is connected to a magnetron 12 whose filament is connected to an A.C. power supply or a D.C. power supply. A capacity voltage divider 14 of predetermined voltage dividing factor, and having an output terminal 16 is connected across the modulator 10 and the magnetron 12. A conventional cathode follower stage 18 having a known gain and having an output terminal 20, is connected at its input end to the output terminal 16 of the capacity voltage divider 14. The cathode follower is included in the circuit to ensure that the impedance across the capacity voltage divider 14 is high; if the impedance across the capacity voltage divider were not high, the voltage pulse would be differentiated. A diode 22 and a synchroscope 24 are connected in series across the output resistor of the cathode follower. The synchroscope 24 includes a calibrated amplifier and a calibrated screen. The synchroscope 24 is coupled to the modulator 10 whereby the sweep of the synchroscope is synchronous with modulator output whereby successive pulses are superimposed on the screen of the synchroscope. A variable clipping means 26 is connected across the synchroscope 22 and operates to establish a threshold bias for inputs to the synchroscope. The cathode follower 18 provides a low impedance to the variable clipping means 26 to allow variations of crystal diode bias. The gain of the cathode follower is known so that the voltage at its output terminal 20 is readily translated into volts across the magnetron. The variable clipping means 26 includes a finely adjustable potentiometer 28 such as the commercial Heliopot, a terminal 30 connected to a regulated power supply, not shown, a bypass condenser 32, and a load resistor 34. The diode 22 permits current to flow through resistor 34 only when the output voltage of the variable clipping means is positive relative to cathode follower output terminal 20.

During interpulse periods the current flow through the cathode follower and the voltage at terminal 20 is maximum. When the magnetron 12 is pulsed by the modulator 10, the grid of the cathode follower 18 is driven negative reducing the current flow through the cathode follower and voltage at terminal 20. If the tap of potentiometer 28 is set so that its output voltage is somewhere between the maximum and minimum voltage at the output terminal 20, current will flow through the load resistor 34 during each pulse interval and the synchroscope will display part or all of the voltage pulse developed across the output resistor of the cathode follower. All of each voltage pulse developed across the output resistor of the cathode follower is displayed on the synchroscope if the output voltage of the variable clipping means 26 is equal to or more positive than the maximum voltage at terminal 20. If the output voltage of the variable clipping means is between the maximum and minimum voltage at the output terminal 20, only that part of each voltage pulse developed across the output resistor of the cathode follower that is below the output voltage of the variable clipping means 26 is displayed on the synchroscope 24. The successive pulse displays on the synchroscope screen are superimposed on each other and appears as a substantially continuous display until further adjustment of the synchroscope amplifier or the variable clipping means. Since the voltage dividing factor of the capacity voltage divider 14 is known and since the gain of the cathode follower 18 is known and since the synchroscope amplifier and screen is calibrated, the height of the display on the synchroscope can be translated into volts. The amplitude hum or ripple in the output voltage of the modulator 10 may be seen and readily measured following sufficient clipping and amplification.

In operation, the synchroscope 24 is set so that successive pulses are superimposed on its screen. The variable clipping means 26 is adjusted so that the displayed pulses are not clipped. The synchroscope positioning control and the synchroscope amplifier are adjusted so that the pulse amplitude fills most of the screen, see FIG. 4. The trailing edge of the pulse is stretched by discharge of the capacitance across the synchroscope input through the high back resistance of the crystal diode 22. The leading edge and top of the pulses are not distorted by the circuit. Since the pulse amplitude hum or ripple is on the order of a fraction of one percent of the amplitude of the pulses it will not then be perceptible on the screen. The height of the pulse display on the screen and amplifier setting is recorded. Then, the variable clipping means 26 is adjusted to increase the threshold voltage at the diode 22. This causes the base portion of the pulse display to be clipped and to disappear from the screen. The synchroscope positioning control and the synchroscope amplifier are adjusted so that only the unclipped or peak portion of the pulses are displayed on the screen. The pulse amplitude hum or ripple shows up as a smear at the peak of the displayed pulses, see FIG. 5. The adjustment of the variable clipping means 26, the positioning control of the synchroscope and the amplifier of the synchroscope is repeated until the amplitude of the smear fills as much of the screen as did the original pulse display. The ratio of the readings obtained from the synchroscope amplifier yields the percentage amplitude hum or ripple. The results are easily converted into volts. Knowing the magnetron pushing figure, the variation in frequency of the energy generated by the magnetron due to the pulse amplitude hum or ripple is obtained. This test procedure is adapted for ascertaining the acceptability of a modulator. If necessary, the amplitude of the pulse amplitude hum is ascertained more accurately by reducing the pulse repetition rate by a factor of 120 or whatever is appropriate and adjusting the synchronizing means and stepping up the spot brightness so that the maxima and minima of the ripple minus the smear is displayed. Another important result obtainable by this test procedure is that the effects of various controlled changes in the pulse circuitry can be observed directly.

A circuit as in FIG. 6 is used to ascertain amplitude hum or ripple in the pulse current of an operating magnetron. The amplitude hum or ripple in the pulse current is caused by amplitude hum or ripple in the output modulator only if the magnetron filament is powered by a regulated D.C. supply. The amplitude hum or ripple in the pulse current is caused by the combined effects of amplitude hum or ripple in the output pulses of the modulator, and A.C. heater effects if the magnetron heater is powered by an A.C. supply. The circuit shown in FIG. 6 is the same for both conditions. The circuit of FIG. 6 includes a modulator 40 and a magnetron 42. A viewing resistor 44 is connected in series with the modulator 40 and the magnetron 42 and carries the magnetron pulse current. The viewing resistor serves the conventional purpose of providing a means whereby the instantaneous pulse current can be examined without introducing objectionable impedance into the magnetron circuit. A diode 48 and a synchroscope 46 are connected in series across the viewing resistor 44. The synchroscope 46 includes a calibrated amplifier and a calibrated screen. The synchroscope 46 is coupled to the modulator 40 whereby the sweep of the synchroscope is synchronous with the modulator output. A variable clipping means 50 is connected across the synchroscope 46 and establishes a threshold bias for voltage inputs to the synchroscope 46. The variable clipping means 50 includes a finely adjustable potentiometer 52 such as the commercial Heliopot, a terminal 54 connected to a regulated power supply, not shown, a bypass condenser 56 and a load resistor 58. The diode 48 permits current to flow through load resistor 58 only when the output voltage of the variable clipping means 50 is positive relative to the voltage at the anode end of the viewing resistor 44.

During the interpulse periods no current flows through the viewing resistor 44. When the magnetron 42 is pulsed by the modulator 40, the anode end of the viewing resistor is driven in a negative direction due to the current flow through the viewing resistor 44. If the tap of the potentiometer 52 is set so that its output voltage is somewhere within the range of voltage excursion at the anode end of viewing resistor 44, current will flow through the load resistor 58 during each pulse interval and the synchroscope screen will display part or all of the voltage pulse developed across the viewing resistor 44 depending upon the setting of the potentiometer 52. All of each pulse developed across the viewing resistor 44 is displayed on the synchroscope screen if the output voltage of the variable clipping means 50 is equal to the voltage at the anode end of the viewing resistor 44 during the interpulse periods. If the output voltage of the variable clipping means 50 is made more negative so that it is somewhere within the range of voltage excursion at the anode end of the viewing resistor 44, only that part of each voltage pulse developed across the viewing resistor 44 that is negative relative to the output voltage of the variable clipping means 50 is displayed on the synchroscope screen. The successive pulse displays on the synchroscope screen are superimposed on each other and appear as a substantially continuous display until further adjustment of the synchoscope positioning control, the synchroscope amplifier and the variable clipping means. Since the resistance of viewing resistor 44 is known and since the synchroscope amplifier and screen are calibrated, the height of the display on the synchroscope can be translated into current through the magnetron. The amplitude hum or ripple in the magnetron pulse current may be seen and readily measured following sufficient clipping and amplification.

In operation, the synchroscope 46 is set so that successive pulses are superimposed on its screen. The variable clipping means 50 is adjusted so that the displayed pulses are not clipped. The synchroscope positioning control and the synchroscope amplifier are adjusted so that the pulse amplitude fills most of the screen, see FIG. 7. Since the pulse amplitude hum or ripple is on the order of a fraction of one percent of the amplitude of the pulses, it will not then be perceptible on the screen. The height of the pulse display on the screen and amplifier setting is recorded. Then the variable clipping means 50 is adjusted so that the base portion of the pulse display is clipped and made to disappear from the screen. The synchroscope positioning control and the synchroscope amplifier are adjusted so that only the unclipped or peak portion of the pulses are displayed on the screen. The pulse amplitude hum or ripple shows up as a smear at the peak of the displayed pulses, see FIG. 8. The adjustment of the variable clipping means 50, the positioning control of the synchroscope, and the amplifier of the synchroscope is repeated until the amplitude of the smear fills as much of the screen as did the original pulse display. The ratio of the readings obtained from the sychroscope amplifier yields the percentage amplitude hum or ripple. The results are easily converted into amperes. If the magnetron filament is connected to a D.C. power supply, the amplitude hum or ripple in the current is due solely to the amplitude hum or ripple in the output of the modulator. If the magnetron filament is connected to an A.C. power supply, the amplitude hum or ripple in the current is due to the combined effects of amplitude hum or ripple in the output of the modulator and A.C. heater effects in the magnetron. If a comparison is made between the amplitude hum or ripple in the pulse current through the magnetron when its filament is connected to an A.C. power supply and when its filament is connected to a regulated D.C. power supply, magnetron frequency modulation due to A.C. heater effect may be isolated and studied.

If the voltage pulses in the circuit of FIG. 3 and the current pulses in the circuit of FIG. 6 are clipped and amplified by the same amount the difference in the hum or ripple on voltage and current is caused by the non linear magnetron impedance; the ratio of the current and voltage smears is proportional to the magnetron's dynamic impedance. Because the voltage dividing factor of capacity voltage dividers 14 is known, the gain of the cathode follower 18 is known and the resistance of the current viewing resistor 44 is known, the magnetron dynamic impedance at that operating point is readily calculated by calculating the ratio $$\frac{\Delta V}{\Delta I}$$

Obviously many modifications and variations of the present invention are possible in the light of the above teachings. It is therefore to be understood that within the scope of the appended claims the invention may be practiced otherwise than as specifically described.

We claim:
1. A method of ascertaining pulse amplitude ripple in a continuous chain of substantially identical pulses comprising the steps of visually displaying the pulses in the chain in superimposed relationship, amplifying the pulses to an extent necessary for the displayed pulses to have a desired height, recording the amplification, then progressively clipping the base portion of the displayed pulses and amplifying the remainder thereof till only the ripple portion of the pulses is displayed, amplifying the ripple portion of the pulses until the height thereof is the same as the aforementioned desired height and recording the amplification, whereby the ripple amplitude may be obtained as a percentage of pulse amplitude by taking the ratio of amplification for the whole pulse display and the ripple display, respectively.

2. A method of ascertaining pulse amplitude ripple as defined in claim 1 further including the step of selecting for display only those pulses of the continuous chain of pulses which have alternately the ripple maxima and the ripple minima to facilitate measurement of ripple amplitude.

3. A method of ascertaining the slope of the impedance of an electronic component at a selected operating point comprising the steps of first applying a continuous chain of substantially identical driving pulses having a small percentage ripple amplitude to the electronic component to cause a corresponding continuous chain of substantially identical current pulses to flow through the electronic component, then measuring the pulse amplitude ripple in the driving pulses and in the current pulses resectively, whereby the pulse amplitude ripple in the driving pulses divided by the pulse amplitude ripple in the current pulses is equal to the slope of the impedance of the electronic component at that operating point.

4. A method as defined in claim 3 wherein the ripple amplitude of each chain of pulses is measured by displaying the pulses of the respective chain of pulses in superimposed relationship and amplifying the display so that it has a preselected height, then progressively clipping the base portion of the display and further amplifying the display until the ripple thereof has said preselected height whereby the ripple amplitude is obtained by taking the ratio of amplification required for the complete pulses to bring them to said preselected height and the amplification required for the ripple to bring it to the preselected height.

References Cited in the file of this patent
UNITED STATES PATENTS

| | | |
|---|---|---|
| 2,448,322 | Piety | Aug. 31, 1948 |
| 2,499,413 | Proskauer et al. | Mar. 7, 1950 |
| 2,750,558 | Woodbury | June 12, 1956 |
| 2,769,957 | Zito et al. | Nov. 6, 1956 |
| 2,812,494 | Durham | Nov. 5, 1957 |

OTHER REFERENCES

Radar Electronic Fundamentals Navships 900,016, Bureau of Ships, Navy Department, published June 1944.

"Tele-Tech and Electronic Industries," March 1954, pages 96, 97, 164–167.